United States Patent
Bauer et al.

(10) Patent No.: US 6,906,623 B2
(45) Date of Patent: Jun. 14, 2005

(54) DEVICE AND METHOD FOR DETECTING DRIVING DATA OF A MOTOR VEHICLE COMPRISING AND ELECTRONICALLY CONTROLLABLE DRIVE TRAIN

(75) Inventors: Wolf-Dietrich Bauer, Leinfelden-Echterdingen (DE); Christian Mayer, Stuttgart (DE); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/380,779
(22) PCT Filed: Aug. 29, 2001
(86) PCT No.: PCT/EP01/09946
§ 371 (c)(1), (2), (4) Date: Dec. 2, 2003
(87) PCT Pub. No.: WO02/25598
PCT Pub. Date: Mar. 28, 2002

(65) Prior Publication Data
US 2004/0088089 A1 May 6, 2004

(30) Foreign Application Priority Data
Sep. 20, 2000 (DE) .......................................... 100 46 832

(51) Int. Cl.[7] .............................................. B60Q 1/00
(52) U.S. Cl. ...................... 340/439; 340/436; 340/438; 340/440; 340/441; 180/271; 701/29; 701/25
(58) Field of Search .................................. 340/436, 438, 340/439, 440, 441; 180/271; 701/29, 35

(56) References Cited

U.S. PATENT DOCUMENTS 5,581,464 A * 12/1996 Woll et al. ..................... 701/35
5,815,093 A * 9/1998 Kikinis ......................... 340/937

FOREIGN PATENT DOCUMENTS

| DE | 42 20 963 A1 | 6/1992 |
| DE | 195 09 711 A1 | 3/1995 |
| DE | 195 46 815 A | 6/1997 |
| EP | 0 871 147 A | 10/1998 |
| WO | WO95 5649 A | 2/1995 |

* cited by examiner

Primary Examiner—Donnie L. Crosland
(74) Attorney, Agent, or Firm—Crowell & Moring LLP

(57) ABSTRACT

A method and apparatus for registering travel data of a motor vehicle with an electronically actuated drive train, utilizing a sensor device for determining actual vehicle data which relates to the travel dynamics, a time-registration device for generating time data, a position-determining device for determining position data of a motor vehicle, and a storage device for at least temporarily storing the actual vehicle, time and position data. The storage device is coupled to operator control elements for the driver-end generation of activation signals for influencing the drive train, and an actuation device for the activation-signal-dependent generation of actuation signals for the drive train. The storage device is designed to store at least temporarily the activation signals and the actuation signals.

20 Claims, 1 Drawing Sheet

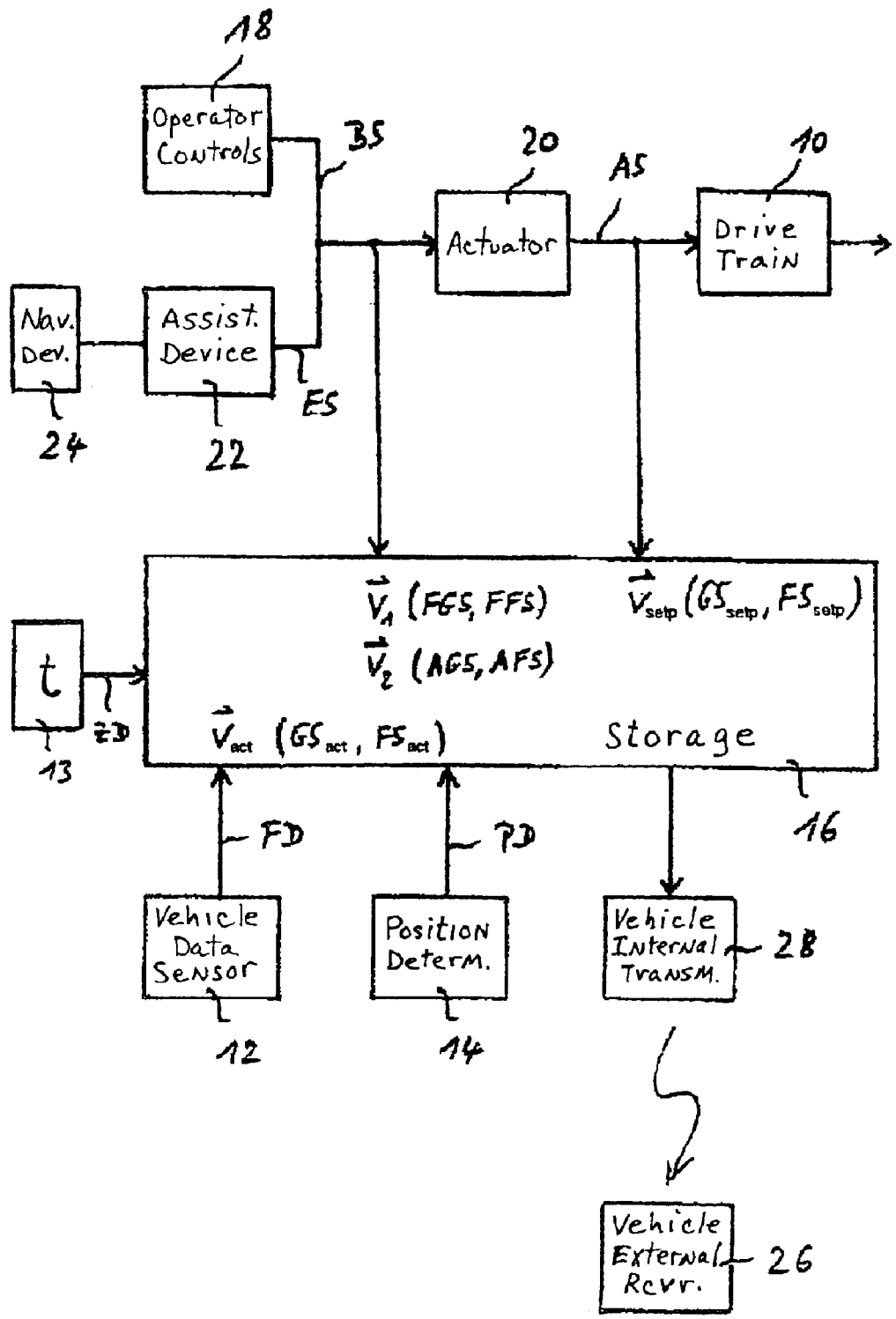

DEVICE AND METHOD FOR DETECTING DRIVING DATA OF A MOTOR VEHICLE COMPRISING AND ELECTRONICALLY CONTROLLABLE DRIVE TRAIN

BACKGROUND AND SUMMARY OF THE INVENTION

This application claims the priority of German patent document 100 46 832.2, filed Sep. 20, 2000 (PCT International Application No. PCT/EP01/09946, filed 29 Aug. 2001), the disclosure of which is expressly incorporated by reference herein.

The invention relates to a method and apparatus for registering travel data of a motor vehicle with an electronically actuated drive train.

German patent document DE 42 20 963 A1 discloses a vehicle navigation system which is used to estimate or determine the location of the vehicle, to register the occurrence of an accident and to store information for use in the analysis of the accident.

An accident data plotter is disclosed in German patent document DE 195 09 711 A1. Data which characterizes the events surrounding an accident is to be stored in a data memory that is embodied as a toroidal core memory. Data for the acceleration, speed, position and correction which are actually supplied by the motor vehicle during travel are stored at least temporarily.

German patent document DE 19546815 A1 relates to the storage of data exchanged by control units over a data transmission line during operation of a control system of a motor vehicle. At least some of the registered data and/or the data transferred over the data transmission line may be stored for later evaluation.

These known devices make it possible to register those actual travel actions which are carried out by the vehicle, as well as the time, location and travel direction for each. However in the case of an accident, for example, this permits only an insufficient analysis of the origins of the accident, as the presence of operator control error by the driver or error in the vehicle system cannot readily be deduced from the stored data.

One object of the present invention, therefore, is to provide a method and apparatus for registering travel data of a motor vehicle, which helps to increase the safety of the vehicle and traffic.

Another object of the invention is to provide a system that permits improved accident analysis.

These and other objects and advantages are achieved by the method and apparatus according to the invention, in which a storage device is coupled to driver operated control elements for generating activation signals for influencing the drive train, and to an actuation device for activation-signal-dependent generation of actuation signals for the drive train. The storage device is designed to store at least temporarily the activation signals and the actuation signals.

In the case of an accident, this arrangement makes it possible, for example, to reconstruct in a particularly simple way whether a driver-end operator control fault or a fault in the electronic actuation of the drive train has led to the accident. For this purpose, the data can be registered with, as it were, a classification into three levels. In the first level, the data are registered on the signal path from the driver via the operator control elements, and as far as the actuation device. In the second level, the data are registered on the signal path from the actuation device as far as the drive train. In the third level, the actual travel data of the motor vehicle which is actually carried out is registered.

In order to provide a possible method of intervening in vehicle control that is independent of the driver or supports the driver, the storage device is connected to a sensor-based assistance device for generating intervention signals that electronically influence the actuation device of the drive train, and is designed to at least temporarily store the intervention signals. In this way, in the case of an accident, conclusions can be drawn about faulty inventions by the assistance device.

The assistance device can interact with a navigation device, such that the intervention signals can be determined by means of position and/or direction presettings thereof, and autonomous or partially autonomous interventions can be satisfactorily reconstructed.

According to one embodiment of the invention, a vehicle-internal transmitter device which is in contact with the vehicle-external receiver device is provided for transferring the actual vehicle data, position data, activation signals, actuation signals and/or intervention signals. Further data processing can take place at the vehicle-external receiver device, permitting the travel data to be evaluated and collected remotely from the vehicle.

The activation signals which are generated by the operator control elements comprise at least speed, position and travel direction signals which are input by the driver. The intervention signals which are generated by the assistance device comprise at least speed, position and travel direction signals which are preset by the assistance device. The actuation signals comprise at least set point speed and position signals and travel direction signals which are generated by the control device. The actual vehicle data which are determined by the sensor device comprise at least actual speed and position signals, as well as travel direction signals. From these movement data it is easily possible to describe precisely the origins of an accident by means of position, speed and direction of the motor vehicle.

The invention also provides a method for registering travel data of a motor vehicle with an electronically actuated drive train. Accordingly, the driver of the motor vehicle presets his drivers' request by means of corresponding data control inputs, as a result of which corresponding activation signals are generated. The activation signals are converted into actuation signals for the drive train as a function of the drivers' request. The actual vehicle data relating to the travel dynamics and position data representing the position of the vehicle are determined. The activation signals, the actuation signals, the actual vehicle data and/or the position data are stored at least temporarily.

The method according to the invention makes it possible, for example in the case of an accident, to reconstruct in a particularly simply way whether the driver-end operator control fault or a fault in the electronic actuation of the drive train has led to the accident.

According to one advantageous embodiment of the invention, the surroundings of a motor vehicle are sensed with respect to the travel situation, in particular in the events on the road that cause intervention signals which trigger travel actions due to the travel situation, and which are converted into corresponding actuation signals for the drive train. The travel-situation-dependent intervention signals are at least temporarily restored.

For an evaluation which is remote from the vehicle, the driver-end activation signals, the travel-situation-dependent intervention signals, the actuation signals for the drive train, the actual vehicle data and/or the position data are transferred to a vehicle-external function unit for further data processing.

The activation signals which represent the drivers' request can be stored as a first movement vector, while the driving-situation-dependent intervention signals can be stored as a second movement vector. The actuation signals can be stored as a set point movement vector and the actual vehicle data can be stored as actual movement vector. Representing the travel data in movement vectors has the advantage of providing clearly organized and easy to handle representation.

In the case of an accident, the stored data can also be read out into a movement vector representation. For further external data processing, the movement vectors can also be transferred to a vehicle-external function unit.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic depiction of an embodiment of the device according to the invention for registering travel data of a motor vehicle with an electronically actuated drive train.

DETAILED DESCRIPTION OF THE DRAWINGS

In the representative embodiment illustrated, the motor vehicle is a truck but it can also be any other motor vehicle. The drive train 10 comprises, inter alia, the engine, the transmission and the steering gear of the motor vehicle. The transmission may be switched mechanically or automatically. In the extended sense, the drive train 10 also comprises further assemblies, the brakes and electronic stabilization systems (ESP). In addition, the drive train 10 may also comprise X-by-wire systems, such as steer-by-wire (electric steering), brake-by-wire (electric brakes) or general drive-by-wire systems. In any case, in the illustrated embodiment the drive train 10 with its components (not shown) is to be capable of actuation by electronic signals AS.

The sensor device 12 is used to determine actual vehicle data FD which relates to the travel dynamics and which comprise at least actual speed signals GS_act and actual position and travel direction signals FS_act. The latter can be represented in the form of an actual movement vector Vact (GS_act, FS_act) which can be handled satisfactorily and which specifies at least the speed and the travel direction of the motor vehicle. The actual movement vector Vact represents travel data that are actually generated by the vehicle.

A movement vector may also contain further current vehicle data, for example the engine speed or acceleration values.

A time-sensing device 13 also generates the current time data ZD. A position-determining device 14 is provided for determining the current position data PD of the motor vehicle. The actual movement vector Vact can additionally comprise the time data ZD as a "time stamp".

A storage device 16 is coupled to operator control elements 18 which are used by the driver to preset his drivers' request, i.e., to control the motor vehicle. The operator control elements 18 comprise, inter alia, the steering wheel, the accelerator pedal, the brake pedal, the clutch pedal, possibly a sidestick (control lever) and similar man/machine interface devices which are necessary for manually controlling the motor vehicle. The operator control elements 18 also permits greater control of the motor vehicle by means of new operator control concepts.

Activation signals BS which influence the drive train 10 are generated by the activation of the operator control elements 18, by means of an electronic sensor system (not shown). The turning of the steering wheel, for example, thus influences the travel direction of the motor vehicle. Such activation signals BS which represent the drivers' request and which are generated by the operator control elements 18 comprise at least speed signals FGS which are input by the driver and position and travel direction signals FFS and can be represented as movement vectors V1 (GGS, FFS). However, the movement vector V1 can also comprises further activation signals BS.

The storage device 16 is also coupled to an actuation device 20 which generates actuation signals AS for the drive train 10 as a function of the activation signal BS which is preset at the driver end. The actuation device 20 comprises, inter alia, the engine control system, the brake control system and possibly the control devices for X-by-wire systems and further control systems for drive train components.

The actuation signals AS comprise set point speed signals Gs_setp and set point travel direction signals FS_setp generated by the actuation device and can be represented as a set point movement vector Vsetp (GS_setp, FS_setp).

The set point movement vector Vsetp(GS_setp, FS_setp) which is preset by the actuation device 20 is processed by the drive train 10 and can also have further set point travel data, influencing or controlling the drive train 10, of the motor vehicle.

The actual vehicle data, time data and position data (FD, ZD, PD) are stored, together with the activation signals BS and the actuation signals As, at least temporarily in the storage device. The storage device 16 is embodied as a sequential memory so that the stored data are retained for a predefined time period. After the predefined time period has passed, the original data are continuously overwritten by the current data.

In the case of an accident, the stored data can be read out and analyzed by means of suitable evaluation devices. On the basis of the analysis results it is easily possible to determine whether an operator control fault of the driver, a fault in the signal forwarding or in the motor vehicle electronics or some other cause has led to the accident.

In the exemplary embodiment shown in the FIGURE, the storage device 16 is connected to a sensor-based assistance device 22. Such assistance devices are used to relieve the driver of unnecessary travel actions and to increase the travel safety. In the illustrative exemplary embodiment, the assistance device 22 comprises a cruise controller for controlling the distance between vehicles which is coupled to a distance radar sensor and by means of which, in particular when travelling on an expressway, a predefined distance from the vehicle travelling ahead can be maintained. As a result, intervention into the longitudinal control and thus in the drive train 10 is provided.

However, the assistance device 22 can also comprise further assistance systems, for example a camera-based "tracking assistance" which determines whether the vehicle is travelling in the anticipated lane. When there is the risk of the vehicle leaving the lane, either a warning signal is output to the driver or a steering intervention is automatically carried out.

Systems which permit the vehicle to be driven in a partially autonomous or completely autonomous way may also be provided as assistance device 22. The drive train is actuated automatically in such a system.

The surroundings of the motor vehicle are sensed by the assistance device 22 in terms of the travel situation, in particular in the events on the road. The assistance device 22 generates intervention signals ES which the actuation device 20 of the drive train 10 influences electronically, for example as an intervention in the longitudinal control. The intervention signals ES are at least partially stored in the storage device 16.

The travel-situation-dependent intervention signals ES which are generated by the assistance device 22 comprise speed signals AGS and position and travel direction signals AFS which are preset by the assistant device 22, and can be represented, in a similar way to, for example, the movement vector V1, as a second movement vector V2 (AGS, AFS).

The assistance device 22 interacts in the embodiment illustrated with a navigation device 24 in such a way that the intervention signals ES are at least also determined by position presettings and/or direction presettings of the navigation device 24. An intervention in the longitudinal control and transverse control of the vehicle can therefore be influenced at least by the navigation device 24.

In addition, systems (not shown) may be provided which correct the intervention by the assistance device 22, and also the activation interventions by the driver on the basis of additionally determined data. This These additional data are acquired by means of suitable sensors. For example, a reactive, correcting intervention in the electronic stability program is possible when detecting wetness or slipperiness of the road surface. A suitable (for example, camera-based) system for sensing the surrounding s c an also help to avoid accidents by trying out corresponding accident-avoiding correction interventions predictively. Pre-crash measures (i.e., interventions in the drive train 10) can thus also be carried out in good time before an unavoidable accident.

In order to collect and evaluate the acquired travel data of the motor vehicle centrally, said data can also be transferred to a control center which is located outside the vehicle. The control center has a vehicle-external receiver device 26. A vehicle-internal transmitter device 28 transfers the actual vehicle data FD, the time data ZD, the position data PD, the activation signals BS, the actuation signals AS and/or the intervention signals ES to the vehicle-external receiver device 26. In order to identify the motor vehicle, an individual vehicle identifier is additionally transferred together with the travel data .

For particularly convenient further processing of the registered data, the movement vector V1 (FGS, FFS), the movement vector V2 (AGS, AFS), the set point movement vector Vsetp (GS_setp, FS_setp) and /or the actual movement vector Vact (GS_act, FS_act) are stored in the storage device 16, but can also be transferred to the vehicle-external function unit for further data processing.

The travel data are registered according to the invention with, as it were, a classification into three levels: in the first level the data are registered on the signal path from the driver via the operator control elements 18 (and/or from the assistance device 22) and as far as the actuation device 20. In the second level, the data are registered on the signal path from the actuation device 20 as far as the drive train 10. In the third level, the actual travel data of the motor vehicle which are actually carried out are registered, for example, in the form of a movement vector Vact.

In summary it is to be noted that, with this device according to the invention or method according to the invention, a very simple and differentiated reconstruction of the events from the input level via the technical correction and as far as the execution level is made possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for registering travel data of a motor vehicle having an electronically actuated drive train, said apparatus comprising:

operator control elements for generating activation signals to control the drive train, said activation signals representing a control operation which is performed by a driver of the motor vehicle;

an actuation device for activation-signal-dependent generation of actuation signals for the drive train, the actuation signals representing conversion of the activation signals by the actuation device;

a sensor device for determining actual vehicle data regarding vehicle dynamics, the actual vehicle data representing travel dynamics which have actually been carried out by the drive train;

a time-registering device for generating time data;

a position-determining device for determining position data of the motor vehicle; and a storage device for at least temporarily storing the activation signals, the actuation signals, the actual vehicle data and the time and position data;

wherein the activation signals, the actuation signals and the actual vehicle data form a data train for mapping an action chain which results from the control operation performed by the driver of the motor vehicle.

2. The apparatus according to claim 1, wherein the storage device is:

connected to a sensor-based assistance device for generating intervention signals for electronically influencing the actuation device of the drive train; and designed to store at least temporarily the intervention signals.

3. The apparatus according to claim 2, wherein:

the assistance device interacts with a navigation device; and the intervention signals can be determined by means of position and/or direction presettings of the navigation device.

4. The apparatus according to claim 1, further comprising a vehicle-internal transmitter device for communicating with a vehicle-external receiver device to transfer at least one of the actual vehicle data, the time data, the position data, the activation signals, the actuation signals and/or the intervention signals.

5. The apparatus according to claim 1, wherein the activation signals that are generated by the operator control elements comprise at least speed signals and position and travel direction signals that are input by the driver.

6. The apparatus according to claim 2, wherein the intervention signals generated by the assistance device comprise at least speed signals and position and travel direction signals that are preset by the assistance device.

7. The apparatus according to claim 1, wherein the actuation signals comprise at least set point speed signals and set point position and travel direction signals that are generated by the control device.

8. The apparatus according to claim 1, wherein the actual vehicle data determined by the sensor device comprises at least actual speed signals and actual position and travel direction signals.

9. A method for registering travel data of a motor vehicle with an electronically actuated drive train, said method comprising:
- a driver of the motor vehicle presetting operator control inputs;
- generating activation signals corresponding to the operator control inputs;
- converting the activation signals into actuation signals for the drive train as a function of a drivers' request, actual vehicle data relating to vehicle travel dynamics and position data;
- storing at least temporarily the activation signals, the actuation signals, the actual vehicle data and/or the position data; and
- forming a data train which is composed of activation signals, actuation signals and actual vehicle data for mapping an action chain which results from a control operation performed by the driver of the motor vehicle.

10. The method according to claim 9, further comprising:
- sensing surroundings related to travel conditions of the motor vehicle, including events on the road;
- generating travel-situation-dependent intervention signals for triggering travel actions in response to the travel conditions;
- converting the intervention signals into corresponding actuation signals for the drive train; and
- storing the intervention signals, at least temporarily.

11. The method according to claim 9, wherein at least one of the driver-generated activation signals, the intervention signals, the actuation signals for the drive train, the actual vehicle data and the position data is transferred to a vehicle-external function unit (26) for further data processing.

12. The method according to claim 9, wherein activation signals comprise at least speed signals and position and travel direction signals which are input by the driver and can be stored as a first movement vector.

13. The method according to claim 10, wherein the intervention signals comprise at least speed signals and position and travel direction signals which are adapted to the travel situation and can be stored as a second movement vector.

14. The method according to claim 10, wherein the intervention signals comprise position signals and direction signals or navigation signals.

15. The method according to claim 9, wherein the actuation signals comprise at least set point speed signals and set point position and travel direction signals which are converted from the activation signals, and can be stored as a set point movement vector.

16. The method according to claim 15, wherein the actual vehicle data comprise at least an actual speed signal and actual position and travel direction signals, and can be stored as an actual movement vector.

17. The method according to claim 9, wherein the stored data are read out upon occurrence of an accident.

18. The method according to claim 16, wherein:
- activation signals comprise at least speed signals and position and travel direction signals which are input by the driver and can be stored as a first movement vector;
- the intervention signals comprise at least speed signals and position and travel direction signals which are adapted to the travel situation and can be stored as a second movement vector;
- the first movement vector, the second movement vector, the set point movement vector and/or the actual movement vector are transmitted to a vehicle-external function unit for further data processing.

19. A method for analyzing fault modes in a vehicle having an electronically actuated drive train, operator control elements for receiving operator control inputs for generating activation signals for influencing the vehicle drive train, and an actuation device for generating actuation signals-responsive to the activation signals, for controlling operation of the drive train, said method comprising:
- storing signals generated by said operator control elements and provided to said actuation device;
- storing actuation signals generated by said actuation device and provided to the drive train;
- sensing and storing actual travel data concerning actual dynamic vehicle operating parameters; and
- upon occurrence of an accident, determining a cause of said accident based on said stored information.

20. The method according to claim 19, wherein:
- the vehicle further includes a sensor-based driver assistance device that generates intervention signals for influencing the actuation device; and
- the intervention signals are also stored, and are analyzed with the stored signals generated by said operator control elements, actuation signals and actual travel data, to determine the cause of the accident.

* * * * *